March 4, 1930.                S. FLAM                1,749,213
PROCESS AND APPARATUS FOR MOLDING
Filed Feb. 19, 1925          5 Sheets-Sheet 4

INVENTOR
Stephen Flam
BY
John Flam
ATTORNEY

March 4, 1930.  S. FLAM  1,749,213
PROCESS AND APPARATUS FOR MOLDING
Filed Feb. 19, 1925   5 Sheets-Sheet 5

INVENTOR
Stephen Flam
BY John Flam
ATTORNEY

Patented Mar. 4, 1930

1,749,213

UNITED STATES PATENT OFFICE

STEPHEN FLAM, OF WALNUT PARK, CALIFORNIA, ASSIGNOR TO SUPERTILE MACHINERY CORPORATION, OF LOS ANGELES, CALIFORNIA, A CORPORATION OF CALIFORNIA

PROCESS AND APPARATUS FOR MOLDING

Application filed February 19, 1925. Serial No. 10,265.

This invention relates to the art of molding plastic material such as concrete, cement or the like, and more particularly it relates to the manufacture of artificial stone for such purposes as building material, pipes, conduits, or the like.

In the manufacture of such material, it is customary to place it, immediately after pouring, in a space where it will become solidified or cured sufficiently to permit removal of the supporting mold. It is one of the objects of my invention to make it possible to reduce the time necessary to place the molds in position in the drying space, and to remove them therefrom after curing.

In the present instance I describe the invention in connection with the manufacture of material having a cored hole therein; as for example, hollow building tile. It is another object of my invention to make it possible to remove the core and simultaneously to deposit the filled mold in the curing space, such as a kiln. In this connection, my invention is most advantageously applied to a multiple mold device, but is not limited therto.

It is still another object of my invention to provide a molding system that can be very simply constructed, and that is simple to operate.

It is still another object of my invention to make it possible to utilize a small equipment of molds and drying kilns for a comparatively large rate of production. It is thus possible to reduce the amount of capital necessary to invest in a plant having a known capacity.

It is still another object of my invention to improve in general the quality of the finished product.

Another object of my invention is to make it possible to use the same set of cores repeatedly in connection with a large number of molds.

As the description proceeds, it will become apparent that my invention has many other advantages. The novel features of construction and operation upon which these advantages rest are set forth in the appended claims. The invention, however, may be best understood from a detailed description of one embodiment of my invention, illustrated in the accompanying drawings. Although but one embodiment is specifically described, it is evident that many other forms of my invention may be devised, as may be ascertained from the breadth of said claims.

Referring to the drawings.

In the present instance I illustrate my invention embodied in a machine for making hollow building tile. The apparatus illustrated in Figs. 1 to 4 inclusive comprises a wheeled truck, preferably of metal such as structural steel, which truck is used for transporting the empty molds to the place where the filling is accomplished, and for later transporting the filled molds to the kilns or other drying spaces. This truck may be of any desired construction, but preferably I utilize one having a comparatively low frame 21 constructed of angle irons. Supported near the rear of the angle iron frame are a pair of bearings 22 in which an axle 23 is journaled. At the extremities of the axles, are fastened the wheel or rollers 24 which rest on the floor 25 and serve as a rear support for the frame 21.

The front supporting rollers 26 are rotatably supported in a pair of swivelled forks 27, whereby the entire truck may be guided in any desired direction. These forks are swivelled for this purpose on vertical axes extending from the frame 21. For facilitating manual movement of the frame on its rollers or wheels, a handle 28 is provided, and is pivoted on frame 21 near its front portion. Since it is immaterial, as far as my invention is concerned, what the details are of the truck frame structure, further detailed description is omitted.

Figure 5:
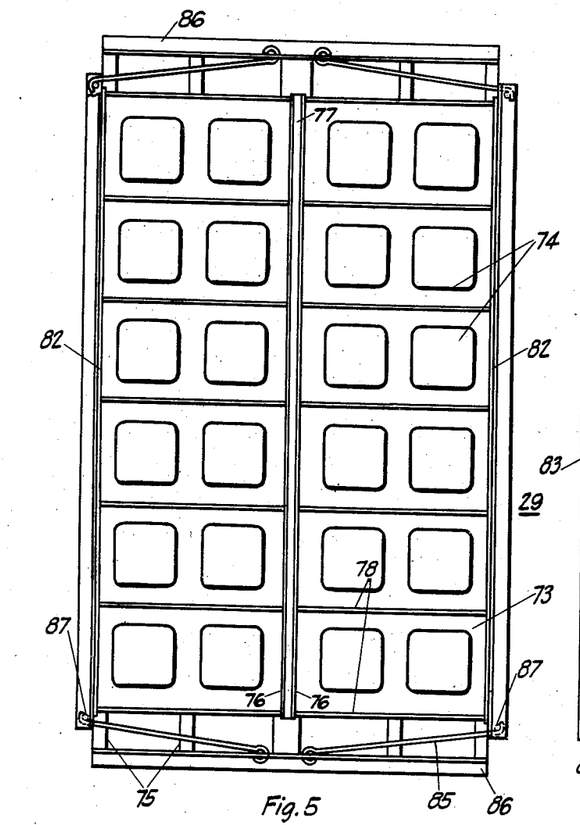
Fig. 5 is a top plan view of a multiple mold adapted to be used in connection with the apparatus of Figs. 1 to 4.
Figure 6:
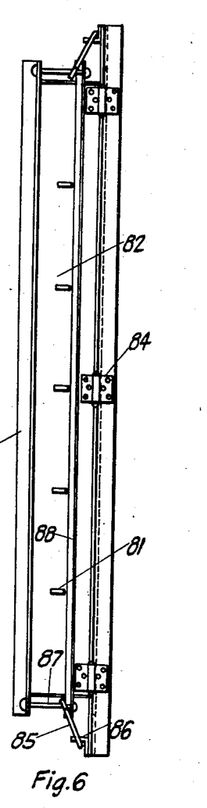
Fig. 6 is a side elevation of the multiple mold.

One of the important features of my present invention resides in the fact that I arrange on the frame 21, a movable support for the mold 29, which is shown in greater detail in Figs. 5 and 6. By the aid of this movable table or support, it is possible to deposit the filled molds in appropriate places in a kiln for curing, and by the same movement, the cores are removed from the mold. The plastic material used in this process is purposely made of such viscosity that little, if any, deformation results after the core is withdrawn, and this deformation is confined only to the material adjacent the core holes. It is possible, as a matter of fact, to pour concrete quite wet and still secure the benefits of this invention, for the reason that this material seems to cling to the mold walls quite closely, and collapse of the cast product is prevented when the core is removed a few seconds after pouring.

Figures 2, 3:
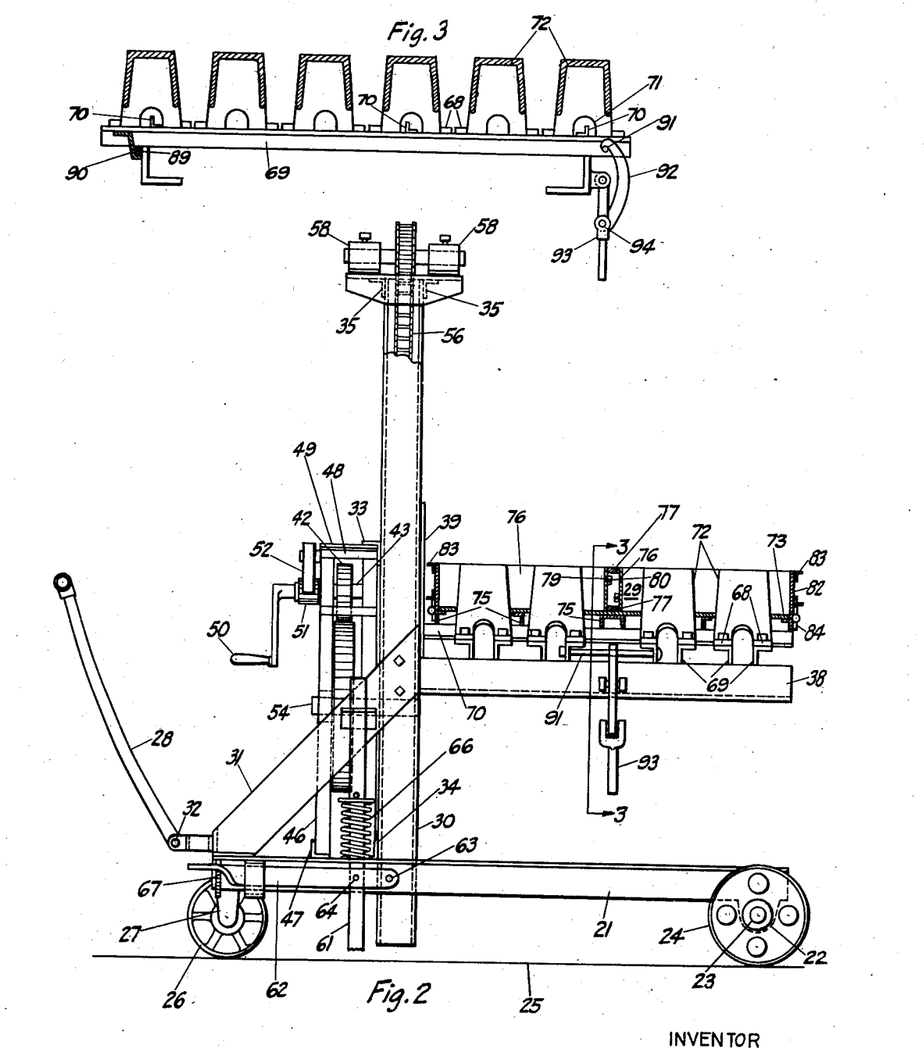
Fig. 2 is a side elevation partly broken away, of the apparatus shown in Fig. 1.
Fig. 3 is a sectional view taken along plane 3—3 of Fig. 2, but with the multiple mold omitted, for the sake of clearness.

For the purpose of providing a rigid structure for the moving support, I fasten a pair of vertical channel irons 30 to the frame 21, in such manner that the channels are opposite and face each other, forming tracks or guides. This can be readily seen from an inspection of Fig. 4. Each of a pair of stiffening braces 31 extends between the frame 21 and a point on the corresponding channel iron 30 that is remote from its connection with the frame 21. As shown in Fig 2, these braces are diagonal and serve also to provide an anchor for the pivot 32 of the handle 28. Another brace 33 in the form of an angle iron may also be used near the middle of the lengths of the channels 30; and a similar brace 34 may be fastened near the feet of the channels, as well as to the top of the angle irons forming the frame 21. The channels 30 are also connected near their top portions by a pair of spaced angle irons 35 having horizontal top angles, serving as supports for mechanism to be later described.

The channels 30 form guides in this instance for a series of rollers 36 engaging between the flanges of the channels, and carried by a vertically movable table support upon which the molds rest. The framework of this support includes a pair of vertical angle irons 37 overlapping the channels 30, as clearly shown in Fig. 4. The rollers 36 are pivotally supported near the tops and bottoms of these angles, on that leg which extends crosswise to the channels in irons 30. In order to provide a rigid vertically movable frame, a sheet metal wall 39 is fastened across the two irons at their rear legs. This wall serves also as a shield for the apparatus from the spattering while pouring the plastic material in the molds supported, as described hereinafter, on the vertically movable frame.

Figure 4:
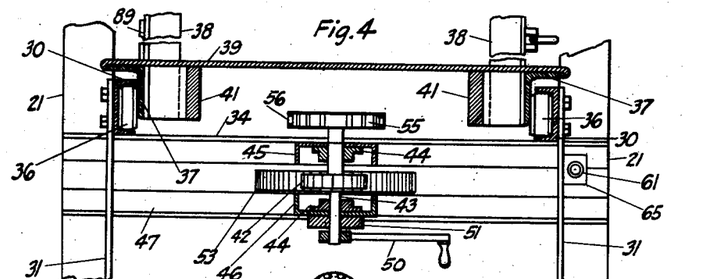
Fig. 4 is an enlarged sectional view, partly broken away, taken along plane 4—4 of Fig. 1, with the cores and molds omitted for the sake of clearness.

A pair of bars 38, preferably angle irons, extend toward the rear of the mechanism, and are fastened to the vertical irons 37, as indicated clearly in Fig. 4. These angle irons extend also toward the front and below the vertical sheet metal wall 39. It is upon these angle irons 38 that the mold structure is supported.

To provide further stiffening for the vertically movable frame, there is a bar 40 extending across the top of wall 39, between the vertical angles 37, and a bent strip 41 is located between the lower surface of this bar, and has its extremities resting on the inner ends of the angle irons 38. This is clearly shown in Fig. 1.

It should be noted that the vertically movable framework is supported at one end only (at the left, on Fig. 2), and that the vertical movement thereof is accomplished by mechanism operated at this end. To raise and lower the framework, a manual gear drive is provided. This drive includes a driving pinion 42. This pinion is fastened to a shaft 43 that is journaled in the bearings 44 fastened in this instance on the inner faces of a pair of vertical channels 45 and 46. These channels at the bottom, rest respectively on the angle irons 34 and 47 that extend across the framework 21. At the top, the channels have a pair of angles 48 connecting them, on top of which a sheet or strip 49 is placed. This strip may also conveniently be fastened to the horizontal flange of the angle iron brace 33, as shown in Fig. 2, so as to anchor the channel iron structure rigidly. While I have detailed the description of structural features of the movable truck, these are to be taken merely as illustrative of any of a generic class of such structures having broadly similar functions.

The shaft 43 extends through the channel 46 and carries at its free end, an operating handle 50 by which the pinion 42 may be rotated. A ratchet wheel 51 is fastened to the shaft 43, and a pawl 52 cooperates therewith to maintain the pinion 42 in any desired place, and to relieve the operator of the necessity of holding the handle 50 to support the weight of the movable frame.

The pinion 42 meshes with a large gear 53 that is fixed to a shaft 54, journaled in bearings supported on the channels 45 and 46. This shaft extends through the rear channel 45, and on this extension, there is carried a sprocket wheel 55 driving a chain 56. This chain passes over an idler wheel 57 supported near the top of the channel frame 30, by the aid of the bearing standards 58. There is a mechanical connection between this chain 56 and the vertically movable carriage, whereby movement of the chain by the rotation of the gears causes a corresponding vertical movement of the frame. In the present instance this is accomplished by the aid of a bolt 59 (Fig. 1) that is fastened, as by the legs 60, to the back of the strip 40 on the carriage. This bolt also passes through the space formed between a pair of the chain links.

As thus far described, it is evident that rotation of handle 50 in a clockwise direction will cause the right hand portion of chain 56 to move upwardly and to carry the carriage vertically upward therewith. The carriage can be left in any vertical position by causing pawl 52 to engage one of the teeth of ratchet 51.

The truck is used to transport the molds to and from the pouring station. In order to prevent the truck from moving inadvertently during the process of pouring, I arrange mechanism to lift the entire truck off its front wheels, and to support it instead on a pipe or rod 61. This pipe is preferably knurled at its bottom to secure an adequate grip, and is pivoted as at 64 (Fig. 2) to a foot operated pedal 62. This pedal is pivoted at 63 to one side of the frame 21. It is evident that by a downward movement of this pedal, the pipe 61 will be urged downwardly with respect to frame 21; and upon engagement of the pipe with the floor 25, the pivot 64 becomes a stationary point; pivot 63 and the associated carriage being lifted upwardly. The pipe 61 passes through the top flange of the frame 21 and is guided near its upper extremity by the bracket 65 fastened to the brace 31. To keep the pipe depressed even after pressure on pedal 62 is released, a notch plate 67 is provided for the front extremity of the pedal to keep it depressed. A spring 66 is also used on pipe 61 to retract the pipe when the pedal 62 is purposely urged out of contact with the notches in plate 67. In this way, the pipe 61 will be raised slightly from the floor as indicated in Fig. 2, and does not interfere with the wheeling of the truck.

In the present instance, I provide a multiple mold having cores 72, which mold is detachably supported on the angle irons 38. Due to the detachable feature, the size and form of the product can be varied at will. The cores 72 are made of thin metallic material, one being shown in section at the left hand portion of Fig. 3. They are each provided with a plurality of ears 68, to permit ready fastening as by bolts to a series of parallel bars 69, forming a grid-like structure. These bars are held in rigid relation by the aid of another series of rigid bars 70, three being shown in this instance, and illustrated as intersecting the other series 69 at right angles. These two series of bars are appropriately fastened together, and the bars of the upper series 70 pass through some of the cores 72, there being openings 71 (Fig. 3) provided near the bottom of each core for this purpose. In the present instance, square cores are shown, but the size and shape may be varied, and in fact, the cores can if desired be entirely omitted to make products of solid material.

The angle irons 70 forming the series of bars serve not only to provide a rigid core support, but also serve in this instance as a rest for the mold proper 29, illustrated in Figs. 2, 5, and 6. This mold comprises a flat bottom plate 73, in which there are a plurality of apertures 74 corresponding in size and position with the cores 72. It is of course understood that as many multiple molds 29 are to be used as convenient or desired, with the same set of cores 72, and that there may be provided as many different kinds of core assemblies as there are different kinds of products desired to be manufactured. The apertures 74 can be passed over the cores 72. The structural irons 75, serving as stiffeners for the plate 74 and fastened to the bottom thereof, rest upon the upper series of bars 71.

In order to provide a plurality of mold spaces, there is a longitudinal central partition fastened to the upper surface of plate 74, and consisting of a pair of spaced sheets 76, held apart by the pair of bars 77, located at the top and bottom of the space formed between the strips 76. There is thus formed a pair of longitudinal spaces, one on each side of this central partition. To divide these spaces still further, I provide a series of vertical separator plates 78 arranged at right angles to the strips 76 and having projections or ears 79 entering into the space between these strips, through slots provided in these strips. These ears are prevented from being pulled out of the slots by the aid of locking wires 80 passing through the ears of plates 78, as clearly indicated in Fig. 2.

The plates 78 are also provided with projections 81 on their free edges, whereby at these edges these plates may also be held in proper position, as by the aid of the longitudinally extending strips 82. These strips are shown as reinforced at the top edge by angle irons 83, and as hinged to the outer angle irons 75 by the aid of the butt hinges 84. The side plates 82 are held in closed position by the aid of hooks 85. These hooks are connected at one end to angles 86, that are fastened to projecting ends of the angles 75 and serve to provide hand holds during the process of placing them on the truck illustrated in Figs. 1 to 4, and of removing them. The free ends of the hooks 85 engage pins 87 located at the ends of the plates 82, between the angles 83 and lower bars 88, which serve as additional reinforcement for the strips 82.

As thus far described, it is evident that the molds 29 may be expeditiously manipulated, and may be closed by simply moving the side plates 82 on their hinges and simultaneously positioning the ears 81 in the slots in these plates. By manipulating the hooks 85, the plates 82 may be retained in the closed position for an indefinite period. The reverse process of opening the molds is fully as simple, and is so evident that no explanation is required.

The truck device illustrated in Figs. 1 to 4 is arranged so that it can accommodate various sizes of molds; and to facilitate the removal and replacement of the molds and the cores, I provide a quick detachable clamp for the core structure. At one side of the frame there is a bar 89 (left hand portion of Fig. 3) that is adapted to be engaged by the Z-bar 90 carried by one of the angles 69. At the other side of the frame there is a short rod 91 adapted to be engaged by a hook 92 pivoted at its end to a hand lever 93. This hand lever is pivoted to the right hand side of the vertical movable frame, and the pivot point 94 between it and hook 92 is located a short distance from the pivot of the lever. In this way, rotation of lever 93 will have the effect of loosening or tightening the hook 92 over the bar 91.

The description of the mold assembly is now complete. The device, assembled as illustrated in Fig. 2, is wheeled to a pouring station, such as adjacent the discharge spout of a concrete mixer, so as to position the mold underneath it. Then if necessary, pedal 62 is depressed to lift the front end of the truck off the wheels 26 and thereby to prevent its slipping. In order to facilitate pouring, appropriate pouring guides may be used in connection with the molds.

Figures 11, 12:
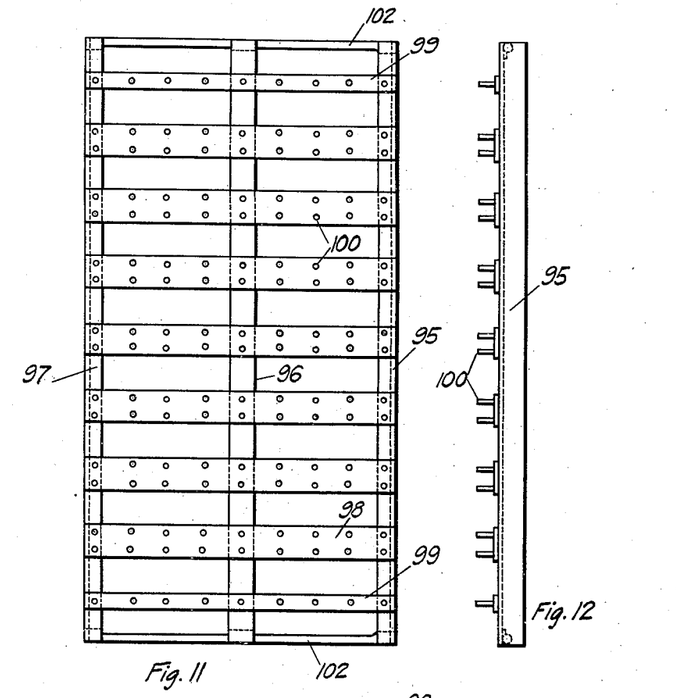
Fig. 11 is a plan view of a tamper used in the process of molding.
Fig. 12 is a side view of the tamper shown in Fig. 11.
Figure 13:
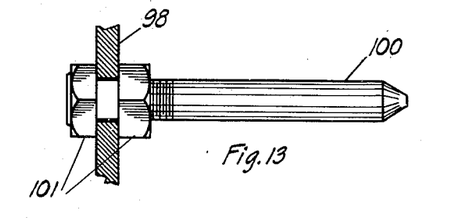
Fig. 13 is a detail view illustrating how the tamper is constructed.

After the mold has been filled, it is preferable to use some form of tamper to pack the plastic material homogeneously in the mold spaces around the cores. A form of tamper that is very convenient to use is illustrated in Figs. 11, 12, and 13; it consists of a grid-like structure, having three longitudinal bars 95, 96, and 97, to which are riveted or otherwise fastened the cross bars 98, 99. These bars serve to support the studs 100 in a manner illustrated in Fig. 13. These studs are fairly closely spaced and are so arranged that they fit into the mold spaces when the tamper is placed over the mold. The tamper illustrated is adapted to cooperate with a mold having sixteen block spaces, but the same general construction is applicable to the twelve unit mold shown in the other figures. Although the fastening of the studs 100 is accomplished in the present instance by the aid of the nuts 101, it is evident that other means may be substituted to accomplish the same results. In order to provide a handle for the tamper, a pair of round bars 102 is fastened to the projecting ends of bars 95, 96 and 97.

In use, each end of the tamper is grasped by an operator stationed at each side of the mold, and it is moved down so that the points or studs 100 project into the plastic material in the mold. Then the tamper is rapidly tilted first in one direction and then the other, by alternately lifting the ends by the aid of handles 102. In this way, all air bubbles can be eliminated, and the plastic material is solidly packed around the cores and between the walls of the mold. Furthermore, the up and down movement of the tamper gives vibration to the plastic mass, which makes it more certain that the product will be free of air spaces and homogeneous.

Figures 7, 8, 9, 10:
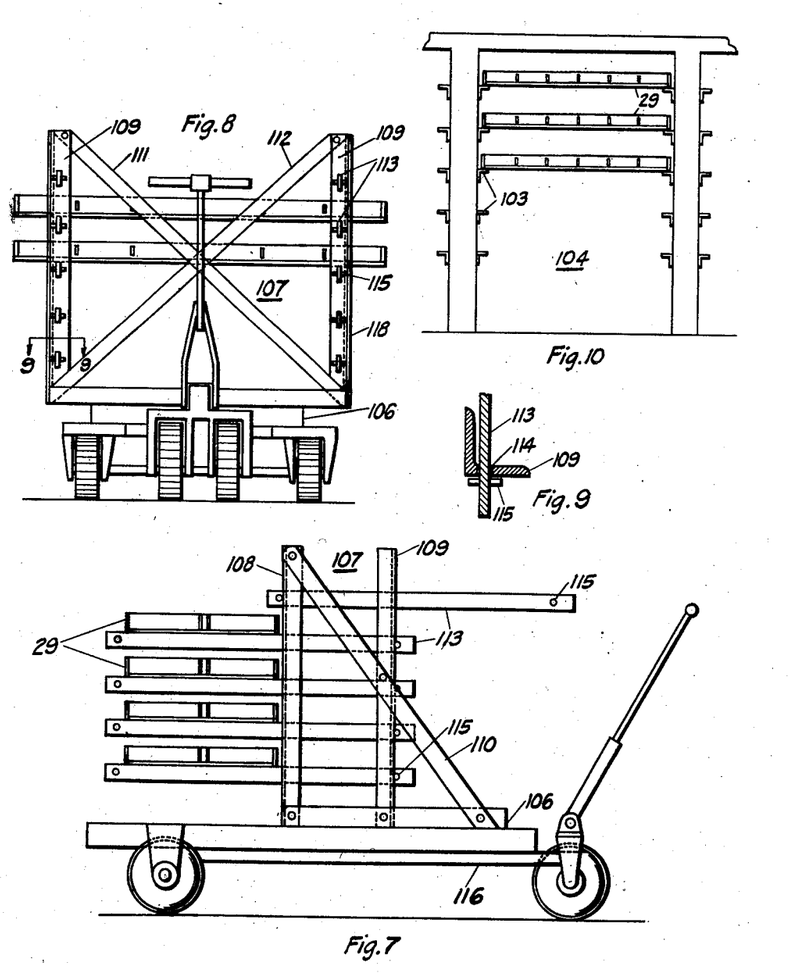
Fig. 7 is a side elevation of a lift truck and its appurtenances used to remove the molds from the kilns.
Fig. 8 is a front elevation of the truck shown in Fig. 7.
Fig. 9 is a detail sectional view taken along plane 9—9 of Fig. 8.
Fig. 10 is a diagrammatic elevational view of a kiln arrangement for curing the molded material.

After the material is sufficiently tamped, the pedal 62 is released, and the truck is wheeled to the kilns, where the filled mold is deposited to cure the product. A kiln compartment is diagrammatically illustrated in Fig. 10. It is seen that space is provided in each compartment for a plurality of molds, arranged in one or more vertical rows adjacent each other. In this instance five molds in each row are provided for, and each is arranged to rest at its ends on the angle irons 103 forming shallow shelves at the side walls of the kiln compartments 104. I find that two such rows of five, one at the rear and the other at the front of kiln space 104, making ten molds, can easily be accommodated in a single curing space. It is of course understood that the kiln compartment may be heated if necessary in any appropriate manner, and if that be done, a closure is preferably provided for the kiln. On the other hand, in some localities open air drying may be resorted to on racks built as indicated in Fig. 10.

One of the important features of my invention is the manner in which the molds 29 are transferred from the truck and onto the angles 103. After pouring, the level of the mold on the truck is adjusted by operation of handle 50, so that when the truck is wheeled into the kiln 104, the edges of the mold 29 are just a trifle higher than the angles 103 on which the mold is to be deposited. To enable the operator to adjust this level quickly and accurately, the left hand channel support 30 of the mold support (Fig. 1) is marked with horizontal gauge lines 117, and there is a cooperating pointer 105 on the bar 40 of the vertically movable carriage. In this way, the truck need only be wheeled into the kiln 104, then the pawl 52 is released and the mold permitted to drop on the cooperating angles 103. Continued movement downwardly of the supporting angles 38 serves to draw all of the cores 72 out of the mold. The downward pull of cores 72 past the plastic material adjacent thereto helps materially in solidly packing it. The handle 50 can then be operated to move the vertical carriage to the position whereby the mold to be next filled will be similarly deposited on the next set of angles 103. As soon as this handle movement is accomplished, an empty multiple mold 29 is placed over the cores 72, and the molding operation is repeated.

It is advantageous to start stacking the molds 29 in the kilns 104 at the top, so that when the cores 72 are pulled out by lowering the vertically movable carriage, it is necessary to raise this carriage by a small amount only to place it at the proper level to cooperate with the next lower shelf 103; furthermore, such an order of stacking is essential because a large clear space is required below the mold that is being deposited, to permit complete removal of the cores; and if the stacking took place from the bottom instead of the top, the shelves 103 would have to be separated vertically by a wastefully large distance. As it is, the lowermost shelf is just high enough above the floor to permit passage of the cores and the truck below it; and the space between the molds 29 is just large enough to permit ready handling.

Because of the fact that the molded products are subjected to the kiln temperature with the cores removed, and a large surface is thereby caused to be subjected to the kiln action, the first stage of the curing process is rapid; and in an hour or so, the products are sufficiently solidified to permit their removal from the molds.

From the foregoing description, it is evident that the acts needed for operating the apparatus are so coordinated that there is little if any lost motion in the process of transporting and molding the material.

Another very important feature of my invention consists in the manner in which the molds 29 are removed from the kiln 104. I accomplish this so that a plurality of them are simultaneously lifted and removed. In this way, another large saving of time is accomplished.

To effect this result, I make use of a lifting mechanism disclosed in Figs. 7, 8, and 9. A convenient type of mechanism for the purpose is a form of hydraulic lift truck 116, having a structure 106 that can be made to raise a few inches by hydraulic pressure. Since trucks of this type are well-known, the details thereof are not illustrated.

On the structure 106 I provide a framework 107 comprising in this instance of a pair of vertical angles 108 and 109 for each side of the truck, and a diagonal brace 110 connecting these verticals and the structure 106. Cross braces 111 and 112 are also provided to ensure against any possibility of undue strains. On this framework 107 there are a plurality of horizontal sliding cantilever supports 113, formed of rigid bars, and arranged in pairs in a vertical sequence. To permit these bars to slide, slots 114 (Fig. 9) are provided in the verticals 108 and 109. Stops such as pins 115 may be used to limit the horizontal movements of the bars 113.

The bars 113 are so spaced that each pair may be passed beneath a mold 29 in the kiln 104, by pushing the truck 116 into the kiln while the truck lifting mechanism is depressed. Then as the structure 106 is caused to rise, all five molds 29 are lifted off the shelves 103 and rest on the bars 113. Then the truck 116 can be backed out, the truck lifting mechanism depressed, and the truck can be wheeled to a yard or the like where the curing of the blocks is to be completed. The top mold can now be opened by manipulation of hooks 85 (Figs. 5 and 6), the blocks being removed therefrom. As soon as the top mold is emptied, it is lifted off the frame 107 and the top bars 113 can be pushed in slots 114 to one side to render the next lower mold available for emptying. In Fig. 7 this condition of the apparatus is disclosed. After the second mold is emptied, it too can be lifted off and its supporting bars pushed aside to render the third mold available. The remaining molds can be similarly treated.

The important feature of my invention resides in the fact that the same set of molds can be used several times during a working day, for the cast product soon acquires sufficient rigidity in the kilns 104 to permit its removal in a reasonably short time.

Figure 1:
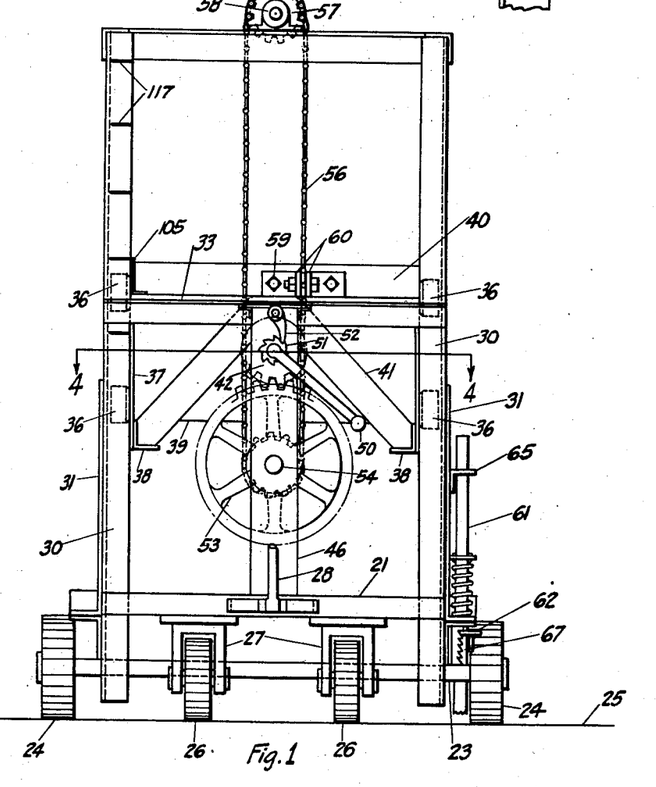
Figure 1 is a front elevation of a molding apparatus used in connection with my invention.

The description of the apparatus is now complete. In order that the method of use be clearly fixed in mind, the operation will be now summarized. The truck mechanism disclosed in Figs. 1, 2, 3, and 4 is first provided with a nest of cores 72 of the desired size and spacing, and this nest is fastened in place by the aid of the hook 92. Then one of the multiple molds 29 is closed as shown in Figs. 5 and 6, by manipulation of hooks 85, and its mold surfaces are covered with a thin film of some material such as oil or soapy water to permit ready separation of the product after setting. The multiple mold 29 is then placed into position on the truck as shown in Fig. 2, and crank 50 is operated until the horizontal position of the mold 29 is correct for pouring. The mold 29 is now ready for pouring. The truck is accordingly wheeled to the pouring station, and the mold is simultaneously filled and tamped by the tamper shown in Figs. 11, 12, and 13. During the process of filling, the pedal 62 is held depressed so as to prevent the truck from moving. After pouring the mold 29 is moved vertically to make it correspond with the level of the topmost shelf 103 in a kiln or drying frame. This is readily accomplished by the aid of the index 105 (Fig. 1). After this, the pedal is allowed to resume the position of Fig. 2, the truck is wheeled into the kiln or drying space 104, and the ratchet wheel 51 is released. The handle 50 may be used to ease the fall of the mold 29 onto the topmost shelf, and it is further turned to move the nest of cores 72 clear down and out of the mold 29. The truck is then wheeled away, and the process of molding repeated; but after the second mold 29 is filled, it is moved to a lower horizontal position, so as to permit it to be passed over the next lower shelf 103. The pulling of cores 72 is accomplished as before. When all of the shelf space is full, the kiln 104 is closed, and heating in the form of live steam or of any other desired character, is applied to the kiln space. While the product in one kiln is being thus preliminarily cured, other kilns are being filled.

After the product is sufficiently set, the heat is shut off, the kiln is opened, and truck 116 is now used to unload all of the molds 29 that are in a vertical row, simultaneously. This is accomplished by setting bars 113 to the left as far as they are permitted to go by the pins 115, then by moving the truck 116 into the curing space 104, a pair of the bars 113 passing underneath each of the molds 29. The lifting mechanism is then operated, the molds 29 being thus all lifted off the shelves 103. The truck 116 is wheeled out, the frame 107 is depressed, and the molds 29 one by one opened, emptied, and lifted off the frame 107. The molds 29 are then again ready for use.

It is evident from the foregoing description that the equipment necessary to keep a force of men busy throughout the day is comparatively small; and that the operations are simple so that unskilled labor can be used for all of them. Although the manufacture of concrete hollow tile is described herein specifically, it is evident that the cores 72 may if desired be omitted, and other forms of molds 29 substituted to produce other kinds of products.

I claim:

1. The process of casting cored articles, which comprises filling a cored mold defining the external and internal surfaces of the articles, with wet plastic material that is incapable before setting, of retaining its molded form without support, and withdrawing the core from the mold before the material has set appreciably, whereby the mold is left around the plastic material which clings thereto and retains it in its cast form.

2. The process of casting cored articles from wet cementitious material such as wet concrete, which comprises filling a cored mold defining the external and internal surfaces of the article with said material, which is incapable before setting of retaining its molded form without support, and withdrawing the core from the mold before the material has set appreciably, whereby the mold is left around the wet material which clings thereto and retains it in its cast form.

3. The process of manufacturing articles by molding, which comprises filling a series of molds, depositing the molds one at a time in a vertical series one above another, in a space where the articles may acquire rigidity sufficient for handling, and simultaneously lifting all of the molds on a common support for removing the molds from the space.

4. The process of manufacturing articles by molding, which comprises supporting a mold at a definite level, filling the mold, transporting and lowering the mold into a space where the articles may acquire rigidity sufficient for handling, successively filling other molds held at successively lowered levels, placing these molds successively in the same space below the others already in the space, and simultaneously lifting all of the molds to remove them from the space.

5. The process of manufacturing cored articles by molding, which comprises filling a mold in which there is a core removable from the mold bottom, transporting the filled mold to a space where the article may acquire sufficient rigidity to permit handling, lowering the core so as to remove it and to permit the mold to rest on supports in the space, filling other successive molds, successively lowering the core in each of these molds to deposit these successive molds below the others, and simultaneously lifting all of the molds to remove them from the space.

6. The process of manufacturing blocks by molding, which comprises filling a mold having a plurality of mold spaces, transporting the mold to a space where the blocks may acquire sufficient rigidity to permit handling, lowering the mold to deposit it in the space, successively filling other similar molds, successively depositing these molds below the others, and simultaneously lifting all of the molds for removing them from the space.

7. The process of manufacturing hollow material by the aid of multiple molds, which comprises supporting a multiple mold in such manner that the cores project through the bottom of the mold, filling the mold, transporting the mold to a space where the material may acquire sufficient rigidity to permit handling, lowering the cores so as simultaneously to deposit the mold in the space, and remove the cores, successively filling and similarly depositing other molds below those already in the space, and simultaneously lifting all of the molds to remove them from the space.

8. In combination, a portable truck, a vertically movable frame supported on the truck at one side of said frame only, a plurality of cores supported on the frame, and a multiple mold having apertures in the bottom through which the cores project, and supported on the frame.

9. In combination, a portable truck, a pair of vertical guides on said truck, a frame guided for movement in said guides, a plurality of cores supported on the frame and with their axes substantially vertical, means for moving the frame vertically, and a multiple mold supported on the frame and having apertures in the bottom through which the cores project.

10. In combination, a portable truck, a pair of vertical guides on said truck, a frame guided for movement in said guides, a sprocket chain attached to the frame, means for moving the chain, whereby the frame may be vertically moved, a plurality of cores supported on the frame, and a multiple mold supported on the frame and having apertures in the bottom through which the cores project.

11. In combination, a portable truck, a vertically movable frame supported on the truck, at one side of said frame only, and a mold supported on the frame.

12. In combination, a portable truck, a pair of vertical guides on said truck, a frame guided for movement in said guides, means for moving the frame vertically, and a mold supported on the frame.

13. In combination, a portable truck, a pair of vertical guides on said truck, a frame guided for movement in said guides, a sprocket chain attached to the frame, means for moving the chain whereby the frame may be vertically moved, and a mold supported on the frame.

14. A multiple core construction, comprising two series of parallel bars intersecting at substantially right angles, and fastened together, and a plurality of hollow cores having feet resting on the bars and fastened thereto.

15. A multiple mold, comprising a series of flat parallel partitions forming a pair of longitudinal spaces, separating plates in the spaces having connection with the center partition, and detachable connection with the end partitions, a bottom plate upon which the separating plates rest, and means for hinging the end partitions to the bottom plate.

STEPHEN FLAM.